United States Patent
Koivunen

[15] 3,684,328
[45] Aug. 15, 1972

[54] BRAKE ANTI-LOCK MODULATOR WITH BYPASS VALVE
[72] Inventor: Erkki A. Koivunen, Livonia, Mich.
[73] Assignee: General Motors Corporation, Detroit, Mich.
[22] Filed: Aug. 19, 1970
[21] Appl. No.: 65,025

[52] U.S. Cl. ............................ 303/21 AF, 303/21 F
[51] Int. Cl. ............................................ B60t 11/34
[58] Field of Search ...188/181; 251/25, 27, 61, 61.5, 251/62; 303/21 AF, 21 F, 61–63, 68–69

[56] References Cited

UNITED STATES PATENTS 3,414,336   12/1968   Atkin et al.................303/21 F
3,449,019   6/1969   Walker.....................303/21 F Primary Examiner—Milton Buchler
Assistant Examiner—Stephen G. Kunin
Attorney—W. E. Finken and D. D. McGraw

[57] ABSTRACT

A brake pressure modulator in a vehicle wheel brake anti-lock system which receives signals from an anti-lock sensor and signal generator and acts to limit, decrease, and increase the brake apply pressure. The modulator is provided with a bypass valve arrangement which allows the modulator valve to be bypassed to return brake control to the vehicle operator independently of the normal operating sequence of the modulator.

4 Claims, 1 Drawing Figure

PATENTED AUG 15 1972
3,684,328
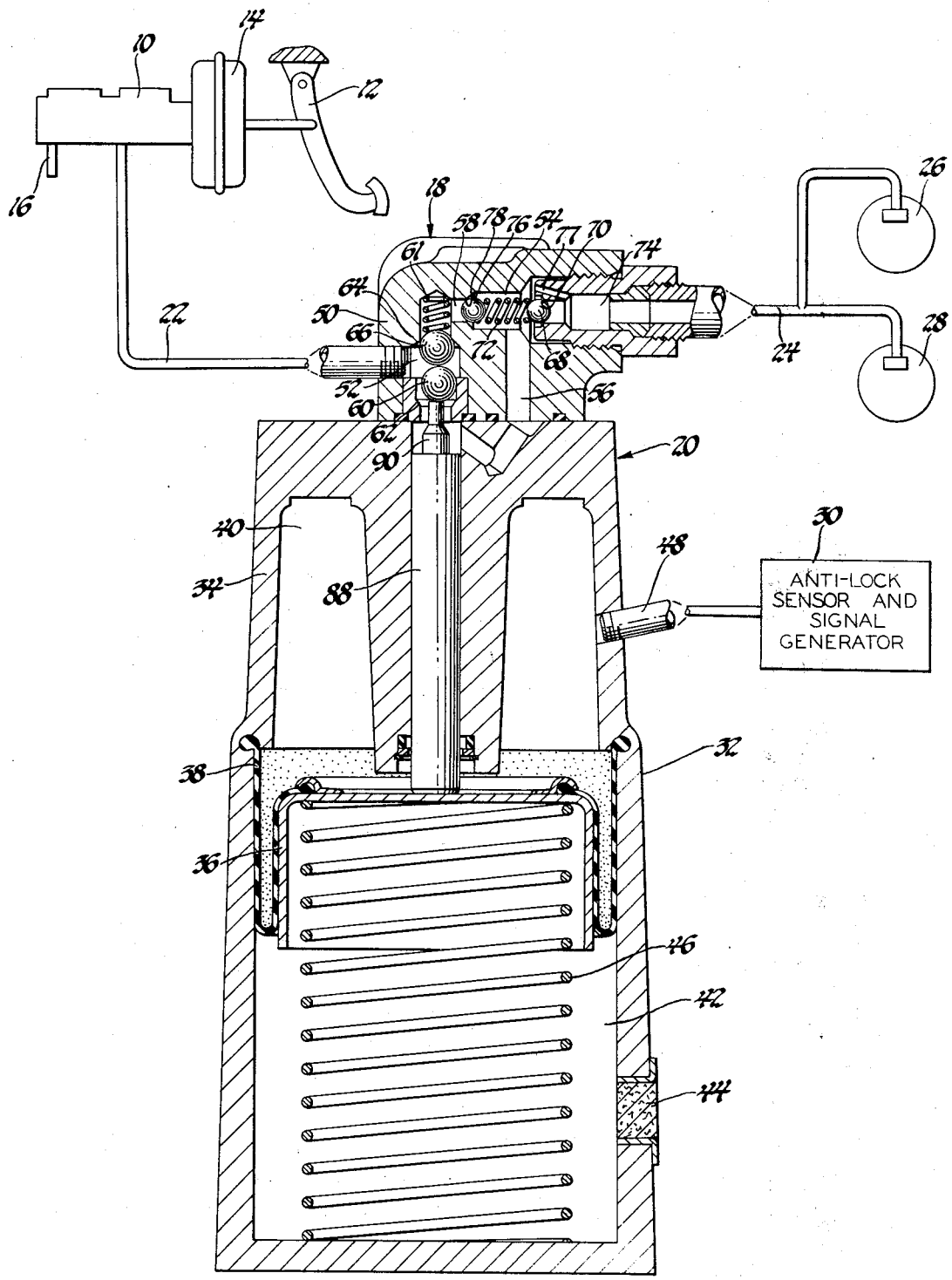
INVENTOR
Erkki A. Koivunen
BY
D. D. McGraw
ATTORNEY ent chamber and a vehicle wheel brake assembly and includes a piston which acts in response to an incipient wheel lock signal generated by an anti-lock sensor to seat a modulator valve, thereby limiting the pressure applied to the brake. The piston can be further withdrawn to increase the brake apply volume and thereby release the pressure on the vehicle wheel brakes to a lesser value allowing the wheels to accelerate. When a desired wheel-to-road slip has been regained, the piston acts to reapply pressure to the wheel brakes and unseat the modulator valve.

The modulator is provided with a bypass valve which can be unseated to open an alternate fluid communication passage to the vehicle brakes in event that the modulator valve remains seated, isolating the master cylinder from the vehicle wheel brakes. The bypass valve is located within the valve chamber adjacent the modulator valve and opposite the piston so that when the piston holds the modulator valve unseated, the modulator valve engages the bypass valve holding it seated. If the piston is withdrawn when the master cylinder is not actuated, seating the modulator valve, the bypass valve follows at the urging of a spring to open the alternate passage, allowing free fluid pressure communication between the master cylinder and the vehicle wheel brakes. If the piston is withdrawn when the master cylinder is actuated, the resulting fluid pressure in the valve chamber holds the bypass valve seated against the force of the bypass valve spring. It is therefore necessary for the vehicle operator to depressurize the valve chamber by releasing the brake pedal so that the valve spring can unseat the bypass valve. Upon subsequent pedal actuation the pressurized fluid is communicated through the alternate passage to the vehicle wheel brake. A check valve located in the alternate passage prevents the outlet pressure from acting against and unseating the bypass valve through the alternate passage.

In the drawing:

The single FIGURE includes a schematic illustration of a vehicle wheel brake anti-lock system including a modulator embodying the invention and having parts broken away and in section.

The vehicle wheel anti-lock system includes a master cylinder 10 which is operated by a pedal 12 and brake booster 14. The master cylinder 10 is illustrated as being of the dual pressure chamber type with the front chamber connected to the front wheel brakes (not shown) by conduit 16. The rear chamber of the master cylinder 10 is connected to the valve section 18 of the modulator assembly 20 by conduit 22. Conduit 24 connects the valve section 18 with the rear vehicle wheel brakes 26 and 28. A wheel anti-lock sensor and signal generator 30 provides a hydraulic pressure signal to the piston section 32 of the modulator assembly 20.

The piston section 32 of the modulator 20 includes a housing 34 in which piston 36 and diaphragm 38 are located. Piston 36 and diaphragm 38 cooperate to form a power wall which divides the piston section 32 into a variable pressure chamber 40 and an atmospheric pressure chamber 42. Vent assembly 44 communicates atmospheric pressure to the atmospheric chamber 42. Spring 46 is located within atmospheric chamber 42 and continuously urges piston 36 in a direction tending to decrease the volume of variable pressure chamber 40. Conduit 48 communicates the hydraulic signal from the wheel anti-lock sensor and signal generator 30 to the variable pressure chamber 40. During normal brake operation, the pressure signal received in variable pressure hydraulic chamber 40 is less than the force of spring 46. Therefore, spring 46 holds the piston 36 in the position shown in the drawing.

The valve section 18 includes a housing 50 in which a primary valve chamber 52 and a secondary valve chamber 54 are located. First passage 56 and second passage 58 connect primary valve chamber 52 and secondary valve chamber 54 and are arranged in parallel flow relationship. Annular valve seat 62 is formed in the lower end of the primary valve chamber 52. A modulator valve 60, illustrated as being a ball type valve, is located in the primary valve chamber 52 so that in its lower position it is seated at valve seat 62 and prevents fluid flow through the first passage 56 from the primary valve chamber 52 to the secondary valve chamber 54. Annular valve seat 64 is formed in the upper end of the primary valve chamber 52. A bypass valve 66, illustrated as being a ball type valve, is normally seated at valve seat 64 to prevent fluid flow through the second passage 58 from the primary valve chamber 52 to the secondary valve chamber 54. Spring 61 urges second valve 66 from seat 64. First check valve 76, illustrated as a ball type valve, is located in secondary valve chamber 54 and is seated against annular valve seat 78 by spring 72 to prevent fluid flow through the second passage 58 in the direction from secondary valve chamber 54 to primary valve chamber 52. A second check valve 68 located in secondary valve chamber 54 is urged into engagement with annular valve seat 70 by spring 72. Second check valve 68 prevents fluid flow from the secondary valve chamber 54 to outlet port 74 when seated. Orifice 77 extends between secondary valve chamber 54 and outlet port 74 and is arranged in parallel flow relationship with second check valve 68 to meter fluid from the secondary valve chamber 54 to outlet port 74.

Piston 88 forms a fluid displaceable means which is reciprocably mounted in housing 34. The upper end of piston 88 forms pin 90 which extends through the second passage 56 and the valve seat 62 to operatively engage modulator valve 60. The lower end of piston 88 sealingly extends through the housing 34 into the variable pressure chamber 40 and into free abutting relationship with the piston 36.

The position of the various elements of the modulator during normal brake operation is shown in the drawing. The force of spring 46 on piston 36 exceeds that of the sensor pressure signal in variable pressure chamber 40 and holds the piston 88 in its upward position unseating modulator valve 60. When unseated at the urging of piston 88, modulator valve 60 engages bypass valve 66 causing it to seat against valve seat 64. This engagement of modulator valve 60 and bypass valve 66 limits the upward movement of pistons 36 and 88. When unseated, modulator valve 60 permits free fluid flow from the first valve chamber 52 to the second valve chamber 54 so that the pressure generated by master cylinder 10 is communicated to the vehicle wheel brakes 26 and 28.

When the sensor and signal generator assembly 30 senses an incipient vehicle wheel brake locking condition, increased pressure is communicated to the variable pressure chamber 40 through conduit 48. When the pressure in variable pressure chamber 40 aided by the brake pressure acting against the upper cross section of piston 88 increases sufficiently to overcome the force of spring 46, piston 36 and the abutting piston 88 move downwardly. As piston 88 moves downwardly, modulator valve 60 is seated, thereby preventing any further increase in the pressure communicated from the master cylinder 10 to the vehicle wheel brakes 26 and 28. The master cylinder generated pressure in primary valve chamber 52 acts against bypass valve 66 to prevent unseating of the bypass valve at the urging of spring 61 when modulator valve 60 is not engaging the bypass valve. Further downward movement of piston 88 by the wheel brake pressure, permitted by downward movement of piston 36 at the urging of the increased pressure in variable pressure chamber 40, causes piston 88 to disengage modulator valve 60 and to increase the volume of the first passage 56 and consequently decrease the pressure communicated to the vehicle wheel brakes. Second check valve 68 can be lifted from valve seat 70 by the differential pressure between the wheel brakes and the second valve chamber 54 to permit a high rate release of pressure from the vehicle wheel brakes upon rapid withdrawal of the piston 88. The free abutting engagement between pistons 36 and 88 permits the piston 88 to remain stationary when the pressure in the second passage 56 approaches zero to prevent the creation of a sub-atmospheric pressure condition and consequent introduction of air into the brake system, and permits piston 36 to move further downward if so urged by the hydraulic pressure communicated from the sensor and signal generator 30. However, in usual operation of the anti-lock system the brake apply pressure is merely released to a somewhat lower pressure sufficient to allow acceleration of the wheels to decrease the wheel slip. When the incipient vehicle wheel brake locking condition has been arrested, the sensor and signal generator assembly 30 releases pressure from the variable pressure chamber 40, allowing spring 46 to move piston 36 and the abutting piston 88 upwardly. The upward movement of piston 88 decreases the volume of first passage 56 thereby increasing the braking pressure at the vehicle wheels. Further upward movement of piston 88 causes engagement and unseating of the modulator valve 60 to permit communication of the master cylinder generated pressure to the wheel brakes. Orifice 77 prevents a sudden high rate increase in the brake pressure if the master cylinder generated pressure is still in excess of the brake pressure.

The modulator valve 60 can be bypassed if piston 88 withdraws, seating first valve 60. If the piston 88 is withdrawn when the primary valve chamber 52 is not pressurized, the withdrawal of piston 88 and the consequent seating of modulator valve 60 allows spring 60 to unseat bypass valve 66 since the fluid pressures in second passage 58 and primary valve chamber 56 are substantially equal. Upon subsequent pedal actuation the resulting pressure generated in master cylinder 10 enters secondary passage 58 and overcomes the force of spring 54 to unseat first check valve 76 and is communicated through orifice 77 to the vehicle wheel brakes. When the operator releases the pedal 12 to release the brakes, the resulting depressurization allows spring 54 to seat first check valve 76 and the differential pressure between the first passage 56 and the primary valve chamber 52 lifts modulator valve 60 from seat 62 to permit fluid return to the master cylinder 10. When piston 88 eventually moves upward it unseats modulator valve 60 and seats bypass valve 66 to return the modulator to the normal position as shown in the drawing.

If the piston 88 is withdrawn when the brakes are applied or when the modulator is operating due to an incipient wheel brake locking condition, the bypass valve 66 will not unseat since the master cylinder generated pressure in the primary valve chamber 52 will not permit spring 60 to unseat bypass valve 66. It is therefore necessary to release the brake pedal 12 so that primary valve chamber 52 is depressurized allowing spring 60 to unseat bypass valve 66. Upon subsequent pedal actuation the pressurized brake fluid is communicated through secondary passage 58 to the vehicle wheel brakes.

While the modulator is illustrated as adapted for use with a vacuum boosted master cylinder and a pair of vehicle brakes, it is obvious that any fluid pressure source could be substituted and the braking pressure could be modulated to one or more vehicle brakes. Furthermore, the bypass valve arrangement of this invention could be adapted for use with a modulator receiving an electrical, vacuum, or mechanical signal from a wheel condition sensor and signal generator assembly.

What is claimed is:

1. A pressure modulator having a piston movable in response to variations in a sensed condition and comprising:

a housing having first and second valve chambers therein;

fluid inlet means communicating fluid pressure from an intermittently operable pressure source to said first valve chamber;

first and second passages formed in said housing and in parallel flow relationship connecting said first and second valve chambers;

modulator valve means located in said first valve chamber and being unseated by differential pressure to permit fluid flow through said first passage in one direction only from said second valve chamber to said first valve chamber;

bypass valve means located in said first valve chamber and permitting fluid flow through said second passage when unseated;

fluid outlet means in said housing communicating fluid pressure from said second valve chamber to a fluid pressure operated apparatus;

first check valve means located in said second valve chamber and being unseated by differential pressure to permit fluid flow through said second passage in one direction only from said first valve chamber to said second valve chamber;

said piston unsealingly extending through said first passage and permitting fluid flow therethrough when in one position to unseat said modulator valve means and seat said bypass valve means when said bypass valve means is unseated thereby permitting free fluid communication between said first valve chamber and said second valve chamber through said first passage and preventing fluid flow through said second passage;

means permitting movement of said piston by pressure in said second valve chamber in a direction permitting said modulator valve means to seat and to increase the volume of said first passage to decrease second valve chamber pressure in response to variations in the sensed condition, pressure in said first valve chamber preventing said bypass valve means from unseating upon movement of said piston from said one position;

and spring means unseating said bypass valve means upon interrupted operation of said fluid pressure source and consequent reduction of fluid pressure in said first valve chamber when said modulator valve means is seated to allow free fluid communication from said first valve chamber to said second valve chamber upon subsequent operation of said pressure source;

said piston movement permitting means forcibly moving said piston to decrease the volume of said second passage to increase said second valve chamber pressure and thereby seat said first check valve means when unseated, and upon further variation in said sensed condition said piston returning to said one position unseating said modulator valve and seating said bypass valve means when unseated.

2. The pressure modulator of claim 1 further characterized by said piston movement permitting means holding said piston in a position determined by said sensed condition and forcibly moving said piston to decrease the volume of said second passage to increase said second valve chamber pressure and thereby seat said first check valve means when unseated.

3. The pressure modulator of claim 1 further characterized by second check valve means located in said second valve chamber and being unseated by differential pressure to permit fluid flow in one direction only from said fluid outlet means to said second valve chamber, fluid pressure restriction means communicating between said second valve chamber and said fluid outlet means in parallel fluid flow relationship with said second check valve means, said fluid pressure restricting means preventing sudden high rate pressure surge from said second valve chamber to said fluid outlet means, said decrease in said second valve chamber pressure upon movement of said piston unseating said second check valve means, said second check valve means being seated by said increase in second valve chamber pressure upon movement of said piston toward said one said position.

4. A pressure modulator having a piston movable in response to variations in a sensed condition and comprising:

a housing having first and second valve chambers therein;

fluid inlet means communicating fluid pressure from an intermittently operable pressure source to said first valve chamber;

first and second passages formed in said housing and in parallel flow relationship connecting said first and second valve chambers;

modulator valve means located in said first valve chamber and being unseated by differential pressure to permit fluid flow through said first passage in one direction only from said second valve chamber to said first valve chamber;

bypass valve means located in said first valve chamber and having a first position blocking flow through the second passage and a second position permitting flow therethrough, the modulator valve means when unseated engaging and holding the bypass valve means in said first position, fluid pressure in the first valve chamber holding the bypass valve means in first position irrespective of engagement by the modulator valve means;

fluid outlet means in said housing communicating fluid pressure from said secondary chamber to a fluid pressure operated apparatus;

said piston extending unsealingly through said first passage and when in one position unseating said modulator valve means to permit free fluid communication between said first valve chamber and said second valve chamber through said first passage;

means permitting movement of said piston by pressure in said second valve chamber in a direction permitting said modulator valve means to seat and to increase the volume of said second passage to decrease second valve chamber pressure in response to variations in the sensed condition, pressure in said first valve chamber holding said bypass valve in said first position upon movement of said piston from said one position;

and means moving said bypass valve means to the second position upon interrupted operation of said fluid pressure source and consequent reduction of fluid pressure in said first valve chamber when said modulator valve means is seated, thereby allowing free fluid communication from said first valve chamber to said second valve chamber upon subsequent operation of said pressure source;

said piston movement permitting means forcibly moving said piston to decrease the volume of said second passage to increase said second valve chamber pressure, and upon further variation in said sensed condition said piston returning to said one position unseating said modulator valve and engaging and moving said bypass valve means to said first position.

* * * * *